(12) United States Patent
Bates et al.

(10) Patent No.: US 7,957,598 B2
(45) Date of Patent: Jun. 7, 2011

(54) METHODS AND SYSTEMS FOR DYNAMIC SCAN COMPRESSION

(75) Inventors: John Booth Bates, Harrodsburg, KY (US); Brian Andrew Brown, Lexington, KY (US); Timothy John Rademacher, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1265 days.

(21) Appl. No.: 11/327,862

(22) Filed: Jan. 9, 2006

(65) Prior Publication Data

US 2007/0162617 A1    Jul. 12, 2007

(51) Int. Cl.
*G06K 9/36* (2006.01)
*G06F 15/16* (2006.01)
*G06K 9/46* (2006.01)

(52) U.S. Cl. ........................................ 382/232; 709/247

(58) Field of Classification Search .................. 382/232, 382/233, 305; 358/1.15, 1.16, 296, 404, 358/444; 709/247; 348/E7.061; 710/68; 370/442; 386/104

See application file for complete search history.

(56) References Cited

U.S. PATENT DOCUMENTS

| | | | | |
|---|---|---|---|---|
| 5,208,676 A | * | 5/1993 | Inui | 358/296 |
| 5,805,932 A | * | 9/1998 | Kawashima et al. | 710/68 |
| 6,385,656 B1 | * | 5/2002 | Appelman | 709/247 |
| 6,507,358 B1 | * | 1/2003 | Mori et al. | 348/42 |
| 6,779,040 B1 | * | 8/2004 | Lee et al. | 709/247 |
| 7,386,226 B2 | * | 6/2008 | Miyoshi et al. | 396/89 |
| 2002/0059463 A1 | * | 5/2002 | Goldstein | 709/247 |
| 2005/0063412 A1 | * | 3/2005 | Osmani | 370/442 |
| 2005/0188112 A1 | * | 8/2005 | Desai et al. | 709/247 |
| 2007/0162617 A1 | * | 7/2007 | Bates et al. | 709/247 |
| 2008/0285952 A1 | * | 11/2008 | Cohen et al. | 386/104 |

* cited by examiner

*Primary Examiner* — Amir Alavi

(57) ABSTRACT

A method for compressing data includes transmitting a requested compression factor such as a quality factor known in JPEG compression, to a scanner or like peripheral device. The type of communication link between the scanner or like device and a host computer is identified, and based on the communication link type, the requested compression factor is altered to generate a new compression factor subsequently used to compress the data. The amount of buffer, such as scan buffer, used by the scanner or peripheral device may also be used to alter the compression factor prior to compression.

13 Claims, 3 Drawing Sheets

METHODS AND SYSTEMS FOR DYNAMIC SCAN COMPRESSION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention is directed to scan compression, and more particularly, to methods and systems for dynamically altering data compression to reduce the amount of bandwidth required for transmission of data.

2. Description of the Related Art

When scanning an image using a scanner or multi-functional device, such as an all-in-one (AIO) scanner/copier/printer/fax, scan data is transmitted to a host computer over a communication medium such as a USB. In conventional scanning systems, high resolutions scans may use all of the available bandwidth of a communication link between a scanner and a host. Even if a scanner can communicate scan data over the communication link at high speeds to preclude bandwidth issues, the receiving device, such as a computer, may be incapable of receiving scan data at such high speeds. This may occur, for instance, if a scanner is a USB 2.0 high-speed device while the receiving computer is a full-speed device compatible with earlier and slower (i.e., lower bandwidth) USB specifications. Sending scan data over full-speed USB uses all available bandwidth at around 300-dpi 24-bit resolution, and scanning at higher resolutions may cause backtracking of the scanner while the scanner waits for the scan data to be received by the receiving computer. This is undesirable from performance, user perception, and image quality perspectives. The situation is made worse if other devices are simultaneously using the same communication link.

Therefore, what is needed are systems and methods that permit the dynamic compression of data based at least in part on the type of communication link between a peripheral device, such as a scanner, and a host computer.

SUMMARY OF THE INVENTION

The invention is directed to systems and methods employed by a scanner or All-In-One (AIO) device to alter the compression used on data, such as scan data, to reduce the amount of bandwidth required for transmitting the data via a communication link such as USB. The invention may employ lossy compression algorithms, such as the ISO-10918 standard used for JPEG compression. The ISO-10918 standard, as well as other lossy compression algorithms as are known in the art, adjust the amount of loss by adjusting quantization values, which also change the compression ratio. Larger quantization values result in more loss and smaller compressed data than smaller quantization values. A quality factor may be used to scale the quantization values.

The present invention dynamically adjusts the quality factor for each scan based on the speed of communication used (e.g., high speed or full speed USB communication), and the amount of scan buffer available for scan data. Therefore, an AIO device or the like can monitor the data buffer (e.g., scan buffer) to determine the quality factor so that the AIO will not 'backtrack', as may otherwise occur when the scan buffer is full. In another embodiment, the AIO may use different types of compression to prevent backtracking. The present invention permits high-speed USB AIO devices to communicate via the USB 2.0 specification (supporting high-speed communication) with computers having high speed hosts and older computers having only full-speed hosts.

According to one embodiment of the invention, there is disclosed a method for compressing data. The method includes transmitting a requested compression factor to a device, where the device is operable to compress data, and identifying the communication link type of a communication link between the device and a host computer. The method further includes adjusting the requested compression factor, based on the communication link type, to generate a current compression factor, and compressing the data using the current compression factor.

According to an aspect of the invention, adjusting the requested compression factor further includes adjusting the requested compression factor based on a comparison of the requested compression factor and a stored compression factor. According to another aspect of the invention, the communication link type includes a high-speed USB or a full-speed USB. Additionally, the method may also include monitoring a buffer of the device, and based on the available capacity of the buffer, adjusting the current compression factor prior to compressing the data. According to yet another aspect of the invention, compressing the data includes compressing the data using a JPEG compression code, and the compression factor is used to scale at least one quantization table.

The method may further include identifying an intended use of the data, and based on the intended use of the data, automatically establishing the requested compression factor. Moreover, the method may also include transmitting the current compression factor to the host computer for use in decompressing the data. According to another aspect of the invention, the device is a scanner, and the data is scan data.

According to another embodiment of the invention, there is disclosed a system for compressing data. The system includes a scanner, in communication with a host computer via a communication link, where the scanner is operable to receive a requested compression factor for compressing scan data and to identify the communication link type of the communication link between the scanner and the host computer. The scanner is further operable to adjust the requested compression factor to generate a current compression factor, based on the communication link type, and to compress the data using the current compression factor.

According to one aspect of the invention, the system also includes a scan buffer monitor operable to monitor the scan buffer, and the scanner is operable to adjust the current compression factor, prior to compressing the data, based on the available capacity of the scan buffer. The system may also include a computer program product stored on the host computer and operable to automatically establish the requested compression factor based on a user-identified intended use of the scan data. According to another aspect of the invention, the communication link type may include a high-speed USB or a full-speed USB.

According to yet another embodiment of the invention, there is disclosed a method for compressing data. The method includes transmitting a use identifier to a scanner, where the scanner is operable to compress scan data, and where the use identifier identifies one of a plurality of intended uses for the scan data. The method also includes compressing the scan data based at least in part on the one of the plurality of intended uses identified by the use identifier.

According to one aspect of the invention, the method also includes transmitting a requested compression factor to the scanner, and compressing the scan data also includes compressing the scan data based at least in part on the requested compression factor. According to another aspect of the invention, the method includes identifying the communication link type of a communication link between, the scanner and a host computer, and compressing the scan data also includes compressing the scan data based on the communication link type. According to yet another aspect of the invention, identifying the communication link type of a communication link includes identifying the communication link type as a high-speed USB or a full-speed USB.

Additionally, compressing the scan data may include compressing the scan data using one of a plurality of compression types, and each of the one of the plurality of compression types may be associated with the one of the plurality of intended uses for the scan data. According to another aspect of the invention, the method may also include monitoring a scan buffer of the scanner, and based on the available capacity of the buffer, adjusting a compression factor for compressing the scan data. Furthermore, the method may include identifying the one of the plurality of compression to the host computer for use in decompressing the scan data.

BRIEF DESCRIPTION OF THE DRAWINGS

Figure 1:
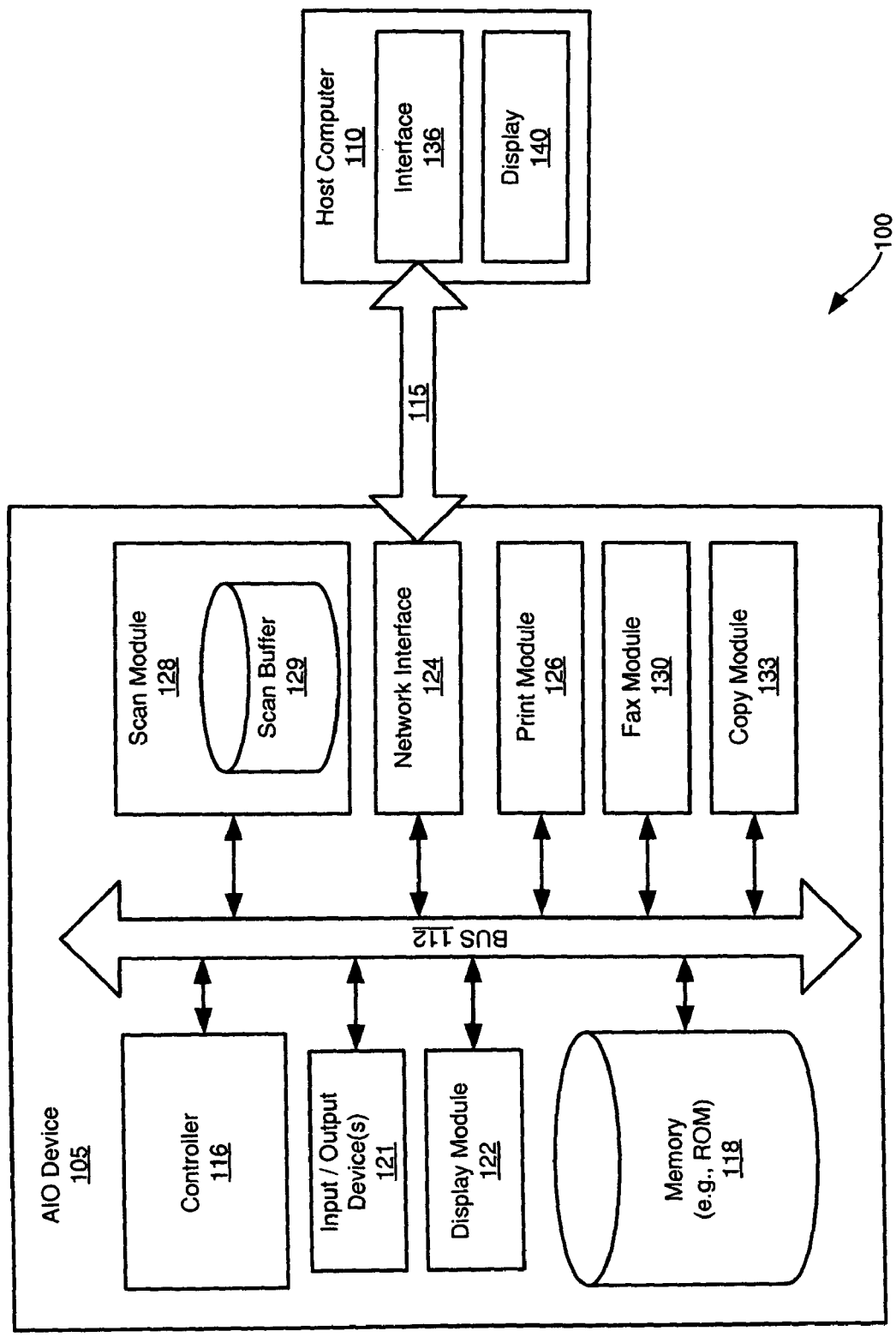
Figure 2:
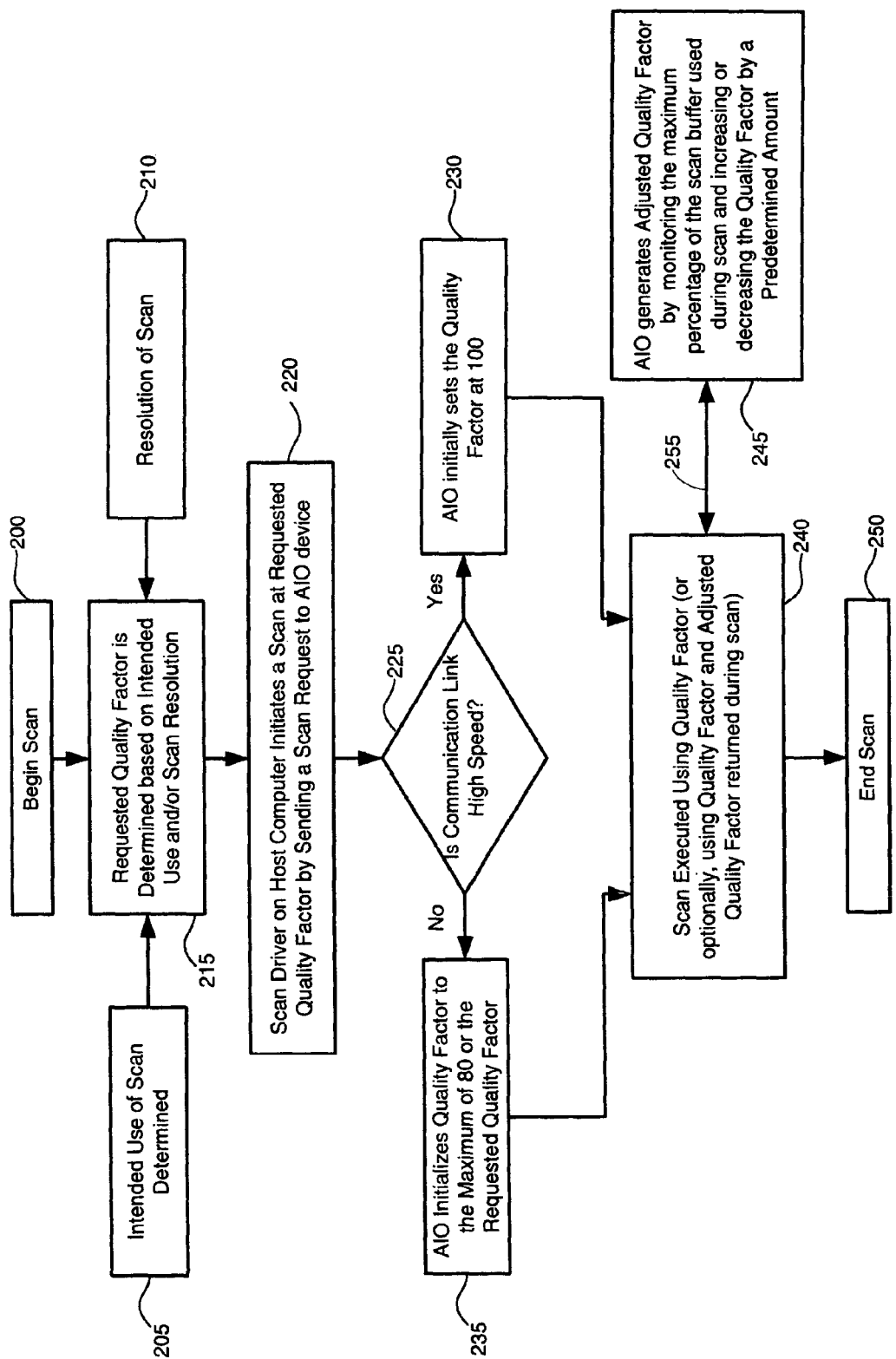
Figure 3:
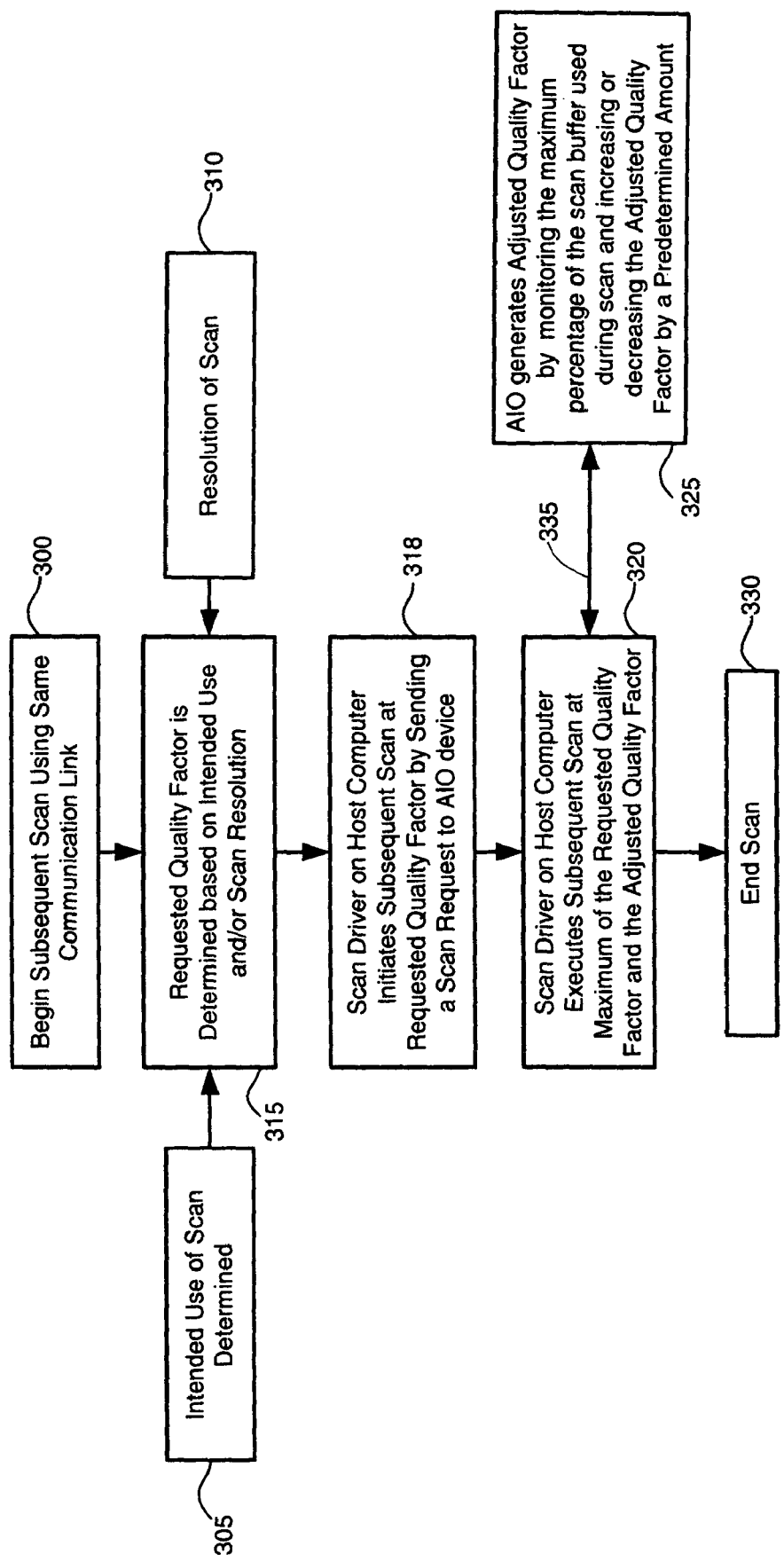

Having thus described the invention in general terms, reference will now be made to the accompanying drawings, which are not necessarily drawn to scale, and wherein:

FIG. 1 shows a system for scanning an image, according to an illustrative embodiment of the present invention;

FIG. 2 is a block diagram flow chart showing a method for dynamically compressing scan data for a first scan request using a newly identified communications link, according to an illustrative embodiment of the present invention; and FIG. 3 is a block diagram flow chart showing a method for dynamically compressing scan data for subsequent scans using a known communication link, according to an illustrative embodiment of the present invention.

DETAILED DESCRIPTION

The present invention will now be described more fully hereinafter with reference to the accompanying figures, in which like numerals indicate like elements throughout the several drawings. Some, but not all embodiments of the invention are described. Indeed, these inventions may be embodied in many different forms and should not be construed as limited to the embodiments set forth herein; rather, these embodiments are provided so that this disclosure will satisfy applicable legal requirements.

It should also be appreciated that the present invention is described below with reference to figures and flowchart illustrations of systems, methods, apparatuses and computer program products according to one or more embodiments of the invention. It will be understood that each block of the flowchart illustrations, and combinations of blocks in the flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions. The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Turning now to FIG. 1, there is shown a system 100 that generally includes a host computer 110, an AIO device 105 operable to execute a scan, and a communication link 115 used to connect the AIO 105 to the host computer 110.

The host computer 110 may be a typical computer used in business or home applications, and may be, for example, a personal computer, including memory, an input device, and a display 140. According to one aspect of the invention, the display 140 may display data provided to the computer 110 via the communication link 115, such as scan data, which may be an image representing a scanned document. The host computer 110 may further include an interface 136, such as a peripheral connection or network interface to permit the host computer 110 to communicate with the AIO device 105 via the communication link. Further, although not illustrated, the host computer 110 may include a processor, one or more software applications, input/output (I/O) interfaces, memory, such as RAM, ROM, NVRAM, a network adapter, a modem for dial-up connection, and at least one mass data storage device, such as a hard drive, a CD-ROM and/or a DVD unit.

The AIO device 105 shown in FIG. 1 may represent a device for use in business or home applications and is operable to perform printing, scanning, copying, and faxing. Although the present invention will be described herein with respect to the AIO device 105 illustrated in FIG. 1, it will be appreciated that the present invention may alternatively be implemented in a stand-alone scanner, copier, or the like, which implements scanning functions. However, for the purposes of brevity the present invention will be described only with respect to an AIO device like the illustrative AIO device 105 shown in FIG. 1.

The AIO device 105 of FIG. 1 generally includes a controller 116, input/output device(s) 121, display module 122, memory 118, network interface 124, a scan module 128, print module 126, fax module 130, and copy module 133.

The memory 118 is operable to store data created by the AIO device 105 or received by the AIO device 105 via the communication link 115 and the network interface 124. The memory 118 may include ROM, RAM, optical media, or other storage, as are well known in the art. According to an embodiment of the invention, the memory 118 is operable to store scan data, as described in detail below, and one or more executable software programs to enable operation of the functions of the AIO device 105. According to one aspect of the invention, the memory 118 may also store data uploaded to the memory 118 from a portable memory device via a portable memory interface (not illustrated). The portable memory interface may permit the host 110 to read/write (R/W) from a disk drive, R/W CD drive, flash media, USB device, or the like that is in communication with the AIO 105. Additionally, as shown in FIG. 1, the input/output device(s) 121 may include one or more buttons and/or touch screen displays for operating the device, as well as the control applications or logic for enabling such devices.

The scan module 128 is operable to effect the scanning of an image, i.e., the acquisition of data from an image. The scan module 128 can include a scan buffer 129, which may be a sensor buffer, or a memory, operable to store at least a portion of scan data generated by the scan module 128. According to one aspect of the invention, although the scan buffer 129 is illustrated as separate from the memory 118, the scan buffer 129 may be combined with, or implemented by, the memory 118 described in detail above. According to one aspect of the invention, the scan buffer 129 may store uncompressed scan data while the memory 118 stores compressed data for transmission to the host computer 110. The scan data represents a digital image, such as a JPEG image, of a document scanned by the AIO device 105. Although not described in detail herein, the scan module 128 includes the necessary hardware and/or software to effect scanning of a document. The scan module 128 also includes the compression algorithms and executable code to implement the functions described herein, which include the dynamic adjustment of compression of scan data.

According to one aspect of the invention, the scan module 128 may operate in conjunction with the controller 116, which may handle at least a portion of the processing required to effect the scanning, compression, and other functions of the AIO 105 described in detail herein. It will also be appreciated that the scan module 128 can also include any suitable electronic and mechanical elements that together effect scanning functions, respectively, of the type that conventionally occur in commercially available multifunction machines.

The print module 126, fax module 130, and copy module 133 enable the AIO device 105 to perform conventional printing, faxing, and copying functions, respectively. Although not described herein, each of these modules, or the AIO device 105, may include the necessary hardware and/or software that allow the AIO to print documents, fax documents, and copy documents. Like the scan module 128, these modules may operate in conjunction with the controller 116, which can handle at least a portion of the processing required to effect the printing, scanning and faxing functions of the AIO 110.

The controller 116 may be a processor that executes computer executable programs with the aid of an operating system (not illustrated). According to other embodiments, one or more of the components illustrated in FIG. 1 may include hardware, such that the functions described herein are performed by hardware components. For instance, the controller 116, scan module 128, print module 126, scan module 128, fax module 130, and/or display/GUI module 122 may be implemented by an application-specific integrated circuit (ASIC), firmware, dedicated components, or the like, as are known in the art. Thus, it will be appreciated that the AIO device 105 may be implemented in an entirely hardware embodiment or in an embodiment combining software and hardware. Additionally, one or more of the components illustrated in the AIO 105 of FIG. 1 may be combined to implement the methods and functions described in detail herein.

As is also shown in FIG. 1, the network interface 124 enables the AIO device 105 to communicate with the host computer 110 via a communication link 115. According to one aspect of the invention, the communication link 115 may be a high speed or full speed USB. The network interface 124 of the AIO device 105, which may be a peripheral connection or network interface, thus facilitates the AIO device's 105 interfacing and communications with the host computer 110 via the communication link 115. Although not illustrated in FIG. 1, the AIO device 105 and/or host computer 110 may include software to configure and/or interpret data communications transmitted via the communication link 115. For instance, the AIO 105 and/or host computer 110 may include one or more software drivers to facilitate communication over the communication link 115.

It will also be appreciated by those of ordinary skill in the art that communication link 115 may include a network, such as a local area network (LAN) or wide area network (WAN) through which the scanner 105 and host computer may communicate. Additionally, the communication link 115 may permit several AIO devices to communicate with one or more of several host computers, thereby forming a network of devices. Thus, it should be appreciated that the system 100 shown in FIG. 1 is intended to be an illustrative and non-limiting example of a system which may embody the present invention described herein.

It will be appreciated that in using the scanning module 128 of the AIO device 105, a document to be scanned is initially placed on a scan bed of the AIO device 105 or fed through a document feeder for scanning. Thereafter, scanning hardware and/or software components of the scan module 128 operate in conjunction with the controller 116 to scan the document. During the scanning of the document, scan data may be temporarily stored in the scan buffer 129. The amount of scan data depends on the resolution of the scan hardware (of the scan module 128) and the size and configuration of the scan buffer 129. The resolution of the scan hardware will generally define the number of sensors used in to effect scanning, as is known in the art. The scan data generally consists of at least one row of pixels. Each pixel has a color that can be represented by a bit depth. For example, the bit depth can be 24 bits, 30 bits, and 36 bits long. It will be appreciated that other bit depths may also be used. According to one aspect of the invention, an entire scanned image may be stored within the scan buffer 129. According to another aspect of the invention, only data from a row of sensors may be stored in the scan buffer 129.

Scan data is typically transmitted via the communication link 115 to the host computer 110 during the execution of a scan by the scan module 128. Thus, scan data is buffered by the scan buffer 129 for imminent transmission to the host computer 110. In conventional scanning systems, high resolutions scans may use all of the available bandwidth of a communication link between a scanner and a host. Even if the AIO device 105 may communicate scan data over the communication link at high speeds to preclude such bandwidth issues, the host computer 110 may be incompatible to receive scan data at such high speeds. This may occur, for instance, if the AIO device 105 is a USB 2.0 high-speed device while the host computer 110 is a full-speed device compatible with earlier and slower (i.e., lower bandwidth) USB specifications. In such a scenario, sending scan data over full-speed USB uses all available bandwidth of the communication link 115 at around 300-dpi 24-bit resolution, and scanning at higher resolutions may cause back-tracking of the scan module 128 while the AIO 105 waits for the scan data to be received by the host computer 110. This is undesirable from performance, user perception, and image quality perspectives. The situation is made worse if other functions of the AIO device 105, such as the printer module, use bandwidth of the communication link 115 simultaneous with the transmission of scan data.

The present invention minimizes or prevents the occurrence of back-tracking by dynamically altering the compression used on data, such as scan data, to reduce the amount of bandwidth required for transmitting the data via the communication link 115. In particular, to effect the compression of data, such as scan data, the AIO device 105 invention employs one or more lossy compression algorithms. According to one aspect of the present invention, the AIO device 105 may employ the ISO-10918 compression standard. The ISO-10918 standard, as well as other lossy compression algorithms as are known in the art, adjust the amount of loss in the scan data by adjusting quantization values, which also change the compression ratio. Larger quantization values result in more loss and smaller compressed data than smaller quantization values. A quality factor may be used to scale the quantization values.

According to an embodiment of the present invention, the AIO device 105 can dynamically adjust the compression for each scan based on the speed of the communication link 115 available (e.g., high speed or full speed USB communication) and the amount of scan buffer 129 available for scan data. More particularly, according to one embodiment of the invention, the compression factor or quality factor parameter of baseline discrete cosine transform (DCT) compression may be dynamically altered to prevent backtracking. The quality factor is used to scale for example ISO-10918 (JPEG) quantization tables and may be adjusted by the present invention for each scan based on a requested quality factor or a requested compression factor, as described below, the communication speed of the communication link 115, and the amount of scan buffer 129 used. To effect compression, RGB scan data from the scan module 128 is converted to YCbCr and compressed using separate Huffman and quantization tables, stored in the memory 118, for the luminance (Y) and chrominance components (Cb, Cr), respectively. According to one aspect of the invention, two quantization tables, each containing 64 quantization values, may be used to implement compression of scan data as described in detail herein.

FIG. 2 is a block diagram flow chart showing a method for dynamically compressing scan data for a first scan request using a newly identified communications link, according to an illustrative embodiment of the present invention. More specifically, as shown in FIG. 2, to execute the first scan request using a newly identified communications link (block 200), a scan driver on the host computer 110 sends a scan request to the AIO device 105. Thus, the host computer 110 may include scanning software, or the like, to receive user scan requests that include the intended use of a scan, and the desired resolution of a scan. Such software may also control one or more host computer 110 scan drivers to execute scan requests.

According to one aspect of the invention, a scan request generated by the host computer 110 includes a requested compression or quality factor (block 215) for use in controlling the amount of loss and the compression ratio used in the ISO-10918 standard lossy compression algorithm. Generally, a higher quality factor applied to an image (defined by scan data) will result in a sharper rendering of the image. A quality factor is a value of 1 to 100 that is used to scale the default quantization tables (for example, such as set forth in ISO-10918); a quality of 1 results in very lossy compression and small compressed data size, and a quality of 100 results in almost no loss and a large compressed data size. The requested compression or quality factor of the present invention may be automatically established by the scan driver on the host computer 110 based on (1) the intended use of the scan (block 205), and/or (2) the resolution of the scan (block 210). These factors, in turn, may be adjusted by a user through manipulation of the scanning software on the host computer 110.

According to one aspect of the invention, the requested compression or quality factor may be based at least in part on three possible intended uses of a scan, including: (1) saving the scan to a file; (2) using the scan for optical character recognition (OCR); or (3) printing the scan. As an illustrative example, a 'use' compression or quality factor of 100 may be the default requested quality factor if the scan is to be used for OCR, as a sharp image may be required for an OCR algorithm, whereas a 'use' quality factor of 80 may be used for saving the scan to file. An intermediate 'use' quality factor of 90 may be the default value for printing the scan. The requested quality factor may be based entirely on the 'use' quality factor, or the 'use' quality factor in combination with a resolution quality factor that is based on the user requested resolution of the scan.

According to an aspect of the invention, it is normally expected that a high resolution could also result in a lower quality factor, such as a value of 80, in that more of the scan buffer is used for the scan data. Lower resolution scans use less of the scan buffer and could cause an increase in the quality factor such as a value of 100. However, it is possible that on occasion a high resolution could also result in a higher requested quality factor, such that the highest resolution available for scanning may result in a resolution quality factor of 100 and a lower resolution scans may have lower resolution quality factor, for example a value of 80. The intended use and resolution of the scan may be equally considered, i.e., averaged, in determining the requested quality factor. According to another aspect of the invention, the higher of the two quality factors may be used to determine the requested quality factor. Further, the user may set the requested quality factor through manipulation of scanning software on the host computer 110. According to another aspect of the invention, the AIO device 105 may also downsample chrominance components on high resolution scans to reduce the bandwidth required to transmit scan data.

After a scan request including a requested quality factor is transmitted to and received by the AIO device 105 (block 220), the AIO device 105 adjusts the requested quality factor transmitted by the host computer 110. The adjustment may be based, at least in part, on the type of communication link 115 used to communicate with the host computer 110 (block 225). The type of communication link 115 is known to the AIO device 105 through identification of the communication link 115 via the network interface 124 and one or more drivers within the memory 118 to effect communication over the communication link 115. If the AIO device 105 communicates with the host computer 110 over a high speed, high bandwidth communication link such as a high-speed USB, the AIO device 105 will establish an initial quality factor of 100 (block 230). On the other hand, if the AIO device communicates with the host computer using a lower speed or lower bandwidth communication link, such as a full-speed USB, the AIO device 105 will establish an initial quality factor that is the maximum of the requested quality factor and 80 (block 235). According to one aspect of the invention, a scan is then executed using the quality factor (block 240).

During the scan, the AIO device 105 will monitor the maximum percentage of the scan buffer used during the execution of the scan, and will adjust the quality factor (thereby generating an adjusted quality factor) by increasing or decreasing it. According to an embodiment of the invention, the AIO device 105 will adjust the quality factor to prevent backtracking (block 245). The AIO device 105, and more particularly, the scan module 128, is operable to monitor the status of the scan buffer 129 (block 245). If the scan buffer 129 is at any time greater than a predetermined limit, for example, greater than 90% full, then the AIO device 105 may decrease the quality factor by one point (block 245). If the scan buffer is completely filled, resulting in back-tracking, the quality factor may be decreased by another second predetermined amount (block 245). Conversely, the quality factor may be increased where the scan buffer 129 maintains available capacity (block 245) during the scan. For instance, if the scan buffer 129 never reaches approximately 50% capacity during a scan, then the quality factor may be increased by a predetermined amounts, for example, one point. Therefore, the quality factor, and thus compression, for subsequent scans may be based on the maximum percentage of scan buffer 129 used. The scan would then be completed (block 255). As described next with respect to FIG. 3, the adjusted quality factor is used for the execution of subsequent scans. As shown in FIG. 2, although a scan may be fully executed using the initially-set quality factor, the quality factor may optionally be adjusted during the scan based on the adjusted quality factor (blocks 240, 245) provided from the monitoring of the scan buffer (block 245), the adjustment and monitoring being indicated by the double-headed arrow 255.

As shown in FIG. 3, the adjusted quality factor (block 245) is used during subsequent scans using the same communication link. As with the process described above with respect to FIG. 2, a requested quality factor of the present invention may be automatically established (block 315) by the scan driver on the host computer 110 based on (1) the intended use of the scan (block 305), and/or (2) the resolution of the scan (block 310). These factors, in turn, may be adjusted by a user through manipulation of the scanning software on the host computer 110.

After a scan request including a requested quality factor (block 315) is transmitted to and received by the AIO device 105, the AIO device 105 may initiate a subsequent scan (block 318) based on a comparison of the adjusted quality factor and the requested quality factor transmitted by the host computer 110. In particular, the scan will be executed at the maximum of the requested quality factor and the adjusted quality factor (block 320). Similar to the process described with respect to FIG. 2, during the execution of the scan, the AIO device 105 will monitor the maximum percentage of the scan buffer used during the execution of the scan, and will further adjust, or regenerate, the adjusted quality factor (block 325) by increasing or decreasing the previous adjusted quality factor used to execute the scan. As with the process described above, if the scan buffer 129 is greater than a predetermined amount, for example, 90% full, then the AIO device 105 may decrease the quality factor for the current communication link by a predetermined amount, for example, one point. If the scan buffer is completely filled, resulting in back-tracking, the quality factor may be decreased by a second predetermined amount, such as for example, another point. Conversely, the quality factor may be increased where the scan buffer 129 maintains available capacity. The scan is then completed (block 330).

As shown in FIG. 3, the adjusted quality factor is used to modify the quality factor for each subsequent scan. However, as was described with respect to FIG. 2, the adjusted quality factor may optionally be adjusted during the scan via feedback provided from the monitoring of the scan buffer (block 325), the adjustment and monitoring being indicated by the double-headed arrow 335. Using the above incremental changes in quality factor, the quality factor may be maintained in a range of about 90 to 100 for a high speed, high bandwidth communication link such as high-speed USB, and about 80 to 100 for a lower speed, lower bandwidth communication link such as full-speed USB.

It should be understood that the AIO device 105 maintains control of the quality factor used in the scanning and will try to use the highest quality factor available based on scan buffer memory size available and speed of communication link 115. In effect the AIO device 105 treats the requested quality factor as a minimum value. It should be further understood that the adjusted scanning resolution only becomes available after the first scan of the image is performed and that only a single quality factor would be used in a single image scan. Alternatively, because as described below, the quality or compression factor is provided in each band of compressed data for the image that is being transmitted to the host computer, it is possible to adjust the quality or compression factor for each band of data in the scanned image with a compression factor for that band of data once the first band of data for an image has been made available.

During the execution of the scan, each band of data returned by the device can include a header, such as a 16-byte header, that includes several fields. These may include: (1) the size, in bytes of the compressed data; (2) the number of rasters contained in the compressed data; (3) the number of pixels contained in each raster; and (4) the quality factor used to compress the data. The last field, the quality factor used to compress the data, informs the driver of the host computer 110 the quality factor for the band to enable the driver to decompress the scan data. This is required because the quality factor specified in the header may be different from the requested quality factor transmitted to the AIO device 105 from the host computer 110.

It will be appreciated that the above-described method implements dynamic changes to the compression of scan data using baseline-DCT compression. According to another embodiment of the present invention, different types of compression may be used. For instance, the compression method used may be selected based on the image content, scan resolution, and image use. In this embodiment, the header transmitted in each band of data returned by the AIO device 105 may include an additional field (in addition to those described above), the type of compression used. To include this parameter the size of the band header may be increased, for instance, from 16 bytes to 20 bytes.

Where different types of compression are used, they may be implemented across different image resolutions, color depths, and image uses. For instance, because OCR algorithms require sharp edges for accuracy, the baseline-DCT compression may not be favorable because it compresses scan data by removing the high-frequency content of an image, which may blur text edges. Therefore, using different types of compression may permit the use of an alternative compression type for OCR, for instance, a lossless compression such as DPCM or run-length encoding as known in the art. The use of various compression types based on use may be stored within a table at the AIO device such that a compression lookup type may be based on the intended use identified by the host computer 110.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for compressing data, comprising:
 receiving a requested compression factor at a device, wherein the device is operable to compress data;
 identifying the communication link type of a communication link between the device and a host computer;
 based on the communication link type, adjusting the requested compression factor to generate a current compression factor;
 compressing the data using the current compression factor;
 monitoring usage of a scan buffer; and
 decreasing the compression factor if the usage of the scan buffer exceeds a maximum usage limit.

2. The method of claim 1, wherein the adjusting the requested compression factor further comprises adjusting the requested compression factor based on a comparison of the requested compression factor and a stored compression factor.

3. The method of claim 1, wherein the communication link type comprises a high-speed USB or a full-speed USB.

4. The method of claim 1, further comprising:
 monitoring a buffer of the device; and
 based on the available capacity of the buffer, adjusting the current compression factor prior to compressing the data.

5. The method of claim 1, wherein compressing the data comprises compressing the data using a JPEG compression code, and wherein the compression factor is used to scale at least one quantization table.

6. The method of claim 1, further comprising:
 identifying an intended use of the data; and
 based on the intended use of the data, automatically establishing the requested compression factor.

7. The method of claim 1, further comprising transmitting the current compression factor to the host computer for use in decompressing the data.

8. The method of claim 1, wherein the device comprises a scanner, and wherein the data comprises scan data.

9. The method for compressing data of claim 1, further comprising:
 generating for each band of data to be compressed the current compression factor; and
 compressing said band of data with said current compression factor for said band.

10. A system for compressing data, comprising:
 a scanner, in communication with a host computer via a communication link, wherein the scanner is operable to:
  receive a requested compression factor for compressing scan data;
  identify the communication link type of the communication link between the scanner and the host computer;
  based on the communication link type, adjust the requested compression factor to generate a current compression factor;
  compress the data using the current compression factor;
  monitor usage of a scan buffer; and
  decreasing the compression factor if the usage of the scan buffer exceeds a maximum usage limit.

11. The system of claim 10, further comprising:
 a scan buffer, wherein the scanner is further operable to monitor the scan buffer, and adjust the current compression factor, prior to compressing the data, based on the available capacity of the scan buffer.

12. The system of claim 10, further comprising a computer program product stored on the host computer and operable to automatically establish the requested compression factor based on a user-identified intended use of the scan data.

13. The system of claim 10, wherein the communication link type comprises a high-speed USB or a full-speed USB.

* * * * *